US011214222B2

(12) United States Patent
Bertossi et al.

(10) Patent No.: US 11,214,222 B2
(45) Date of Patent: Jan. 4, 2022

(54) OCCUPANT RESTRAINT SYSTEM (71) Applicant: ZF Passive Safety Systems US Inc., Washington, MI (US)

(72) Inventors: Rico Scott Bertossi, Kenockee, MI (US); Ali Emambakhsh, Rochester, MI (US); Dylan Moran, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 52 days.

(21) Appl. No.: 16/748,975

(22) Filed: Jan. 22, 2020

(65) Prior Publication Data

US 2021/0221323 A1 Jul. 22, 2021

(51) Int. Cl.
*B60R 21/231* (2011.01)
*B60R 21/21* (2011.01)
*B60R 21/213* (2011.01)
*B60R 21/017* (2006.01)
*B60N 2/20* (2006.01)
*B60R 21/013* (2006.01)
*B60R 21/00* (2006.01)

(52) U.S. Cl.
CPC .......... *B60R 21/23138* (2013.01); *B60N 2/20* (2013.01); *B60R 21/013* (2013.01); *B60R 21/017* (2013.01); *B60R 21/21* (2013.01); *B60R 21/213* (2013.01); *B60R 2021/0044* (2013.01); *B60R 2021/0048* (2013.01); *B60R 2021/23107* (2013.01)

(58) Field of Classification Search
CPC ................. B60R 21/23138; B60R 21/213
See application file for complete search history.

(56) References Cited

U.S. PATENT DOCUMENTS

| 5,161,821 | A | * | 11/1992 | Curtis | B60R 21/18 280/730.2 |
| 5,845,935 | A | * | 12/1998 | Enders | B60R 21/23138 280/743.2 |
| 5,868,421 | A | | 2/1999 | Eyrainer | |
| 5,921,576 | A | * | 7/1999 | Sinnhuber | B60R 21/217 280/730.2 |
| 9,333,931 | B1 | * | 5/2016 | Cheng | B60R 21/08 |
| 10,336,278 | B2 | * | 7/2019 | Schneider | B60R 21/207 |
| 10,850,699 | B2 | * | 12/2020 | Dry | B60R 21/231 |

(Continued)

FOREIGN PATENT DOCUMENTS

| DE | 102011051338 A1 * | 6/2012 | ........... B60R 21/232 |
| DE | 102015109919 A1 * | 1/2016 | ....... B60R 21/23138 |

(Continued)

*Primary Examiner* — Nicole T Verley
(74) *Attorney, Agent, or Firm* — Tarolli, Sundheim, Covell & Tummino LLP (57) ABSTRACT

A restraint system for helping to protect an occupant of a vehicle having a side structure and a cabin with a seat for the occupant includes an airbag having a stored condition outboard of the occupant. The airbag is inflatable to a deployed condition positioned between the occupant and the vehicle side structure. The airbag extends in a forward-rearward direction from a first end positioned in front of the occupant to a second end positioned behind the occupant such that a torso and head of the occupant are laterally aligned with the second end when the seat is placed in a reclined position.

21 Claims, 8 Drawing Sheets

(56) References Cited

U.S. PATENT DOCUMENTS

| | | | |
|---|---|---|---|
| 2003/0075910 A1* | 4/2003 | Inoue | B60R 21/08 |
| | | | 280/749 |
| 2014/0203542 A1* | 7/2014 | Fukawatase | B60R 21/23138 |
| | | | 280/730.2 |
| 2018/0215338 A1* | 8/2018 | Faruque | B60R 21/214 |
| 2019/0161046 A1* | 5/2019 | Thomas | B60R 21/23138 |
| 2019/0161053 A1* | 5/2019 | Gwon | B60R 21/231 |
| 2019/0193665 A1* | 6/2019 | Jimenez | B60R 21/2338 |
| 2019/0202395 A1* | 7/2019 | Obayashi | B60R 21/23138 |
| 2020/0290552 A1* | 9/2020 | Saso | B60R 21/21 |

FOREIGN PATENT DOCUMENTS

| | | | | |
|---|---|---|---|---|
| DE | 102018101396 A1 * | 7/2019 | | B60R 21/23138 |
| DE | 102018114771 A1 * | 12/2019 | | B60R 21/233 |
| DE | 102018124371 A1 * | 4/2020 | | B60R 21/23138 |
| DE | 102019107365 A1 * | 9/2020 | | B60R 21/23138 |
| EP | 1193141 A2 * | 4/2002 | | B60R 21/207 |
| EP | 2441627 A1 * | 4/2012 | | B60R 21/23138 |
| EP | 3536563 A1 * | 9/2019 | | B60R 21/233 |
| FR | 2781738 A1 * | 2/2000 | | B60R 21/21 |
| JP | 2018127110 A * | 8/2018 | | |
| WO | WO-2013183130 A1 * | 12/2013 | | B60R 21/231 |
| WO | WO-2017179839 A1 * | 10/2017 | | B60R 21/23138 |
| WO | WO-2020254218 A1 * | 12/2020 | | B60R 21/233 |

* cited by examiner

OCCUPANT RESTRAINT SYSTEM

TECHNICAL FIELD

The present invention relates generally to vehicle airbags and, in particular, relates to airbags that use the vehicle side structure as a reaction surface.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one aspect, a restraint system for helping to protect an occupant of a vehicle having a side structure and a cabin with a seat for the occupant includes an airbag having a stored condition outboard of the occupant. The airbag is inflatable to a deployed condition positioned between the occupant and the vehicle side structure. The airbag extends in a forward-rearward direction from a first end positioned in front of the occupant to a second end positioned behind the occupant such that a torso and head of the occupant are laterally aligned with the second end when the seat is placed in a reclined position.

In another aspect, a restraint system for helping to protect an occupant of a vehicle having a side structure and a cabin with a seat for the occupant includes an airbag having a stored condition outboard of the occupant. The airbag is inflatable to a deployed condition positioned between the occupant and the vehicle side structure. The airbag includes an upper end positioned adjacent a headrest of the seat and a lower end positioned adjacent a seat base of the seat. The airbag extends in a forward-rearward direction from a first end positioned in front of the occupant to a second end positioned behind the occupant. The second end includes a tapered portion laterally aligned with a torso and head of the occupant when the seat is placed in a reclined position.

In yet another aspect, a restraint system for helping to protect an occupant of a vehicle having a side structure and a cabin with a seat for the occupant includes an airbag having a stored condition outboard of the occupant. The airbag is inflatable to a deployed condition positioned between the occupant and the vehicle side structure. The airbag includes an upper end positioned above a headrest of the seat and a lower end positioned adjacent a base of the seat. The airbag extends in a forward-rearward direction from a first end positioned adjacent a leading end of the seat to a second end positioned behind the seat such that a torso and head of the occupant are laterally aligned with the second end when the seat is placed in a reclined position.

According to one aspect, taken alone or in combination with any other aspect, the airbag is positioned in a B-pillar of the vehicle.

According to one aspect, taken alone or in combination with any other aspect, the airbag is positioned in a door of the vehicle.

According to one aspect, taken alone or in combination with any other aspect, the second end includes first and second edge portions extending at an angle relative to one another.

According to one aspect, taken alone or in combination with any other aspect, the first edge portion extends from a lower end of the airbag and the second edge portion extends from the first edge portion to an upper end of the airbag.

According to one aspect, taken alone or in combination with any other aspect, the first edge portion extends at about 45° from the forward-rearward direction.

According to one aspect, taken alone or in combination with any other aspect, the second edge portion extends substantially vertically from the first edge portion.

According to one aspect, alone or in combination with any other aspect, the airbag extends from an upper end positioned adjacent a headrest of the seat to a lower end positioned adjacent a seat base of the seat.

According to one aspect, taken alone or in combination with any other aspect, the second end includes a tapered portion extending substantially parallel to the seat in the reclined position.

According to one aspect, taken alone or in combination with any other aspect, the airbag is spaced from a roof of the vehicle when in the deployed condition.

According to one aspect, taken alone or in combination with any other aspect, a sensor is provided for sensing the occurrence of an event for which deployment of the airbag is desired and produces a signal indicative thereof. A controller is connected to the sensor and, in response to receiving the signal, actuates an inflator to inflate the airbag to the deployed condition.

Other objects and advantages and a fuller understanding of the invention will be had from the following detailed description and the accompanying drawings.

DETAILED DESCRIPTION

Figure 1:
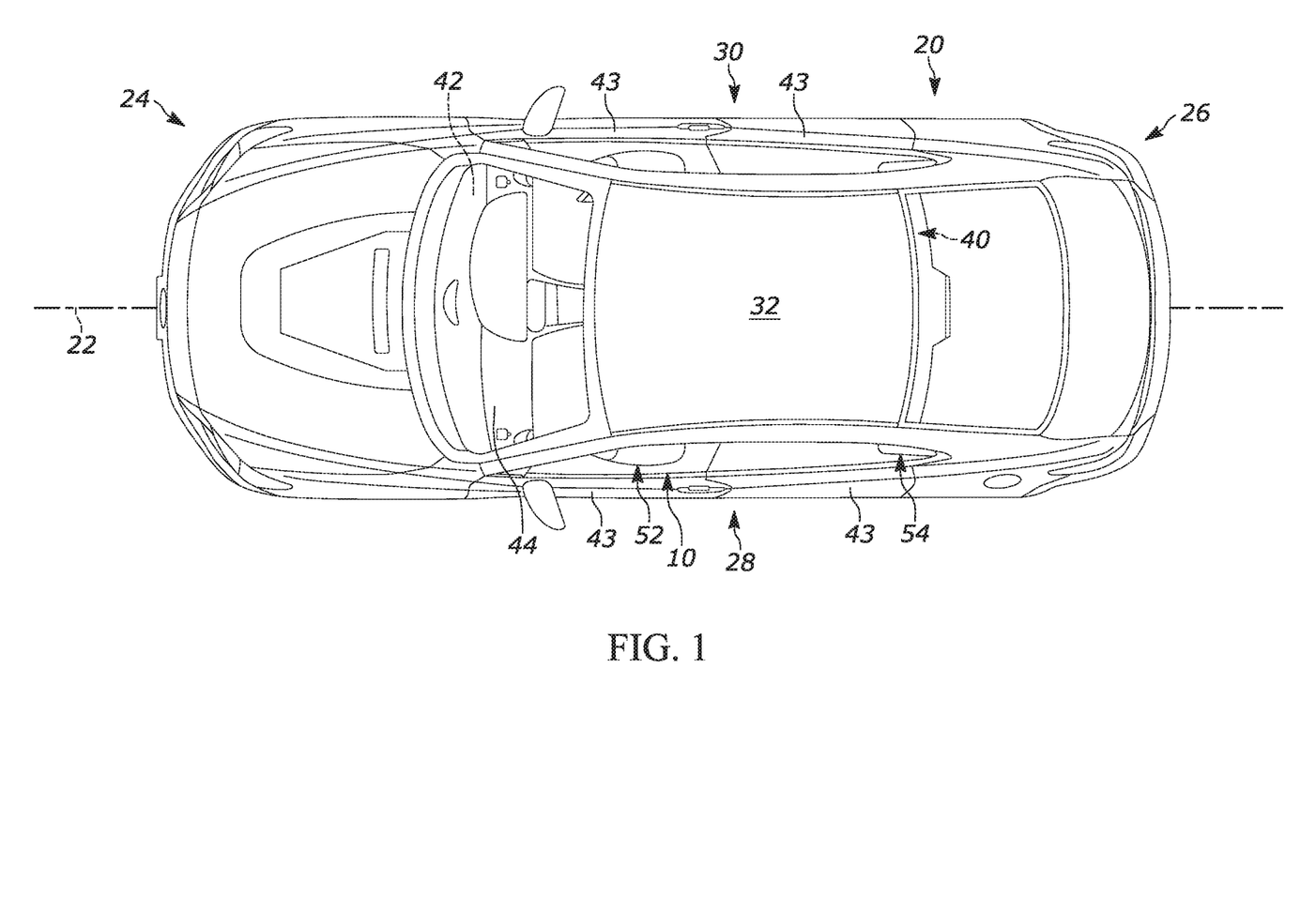
FIG. 1 is a top view of a vehicle including an example occupant restraint system mounted to a side structure of the vehicle.
Figure 2:
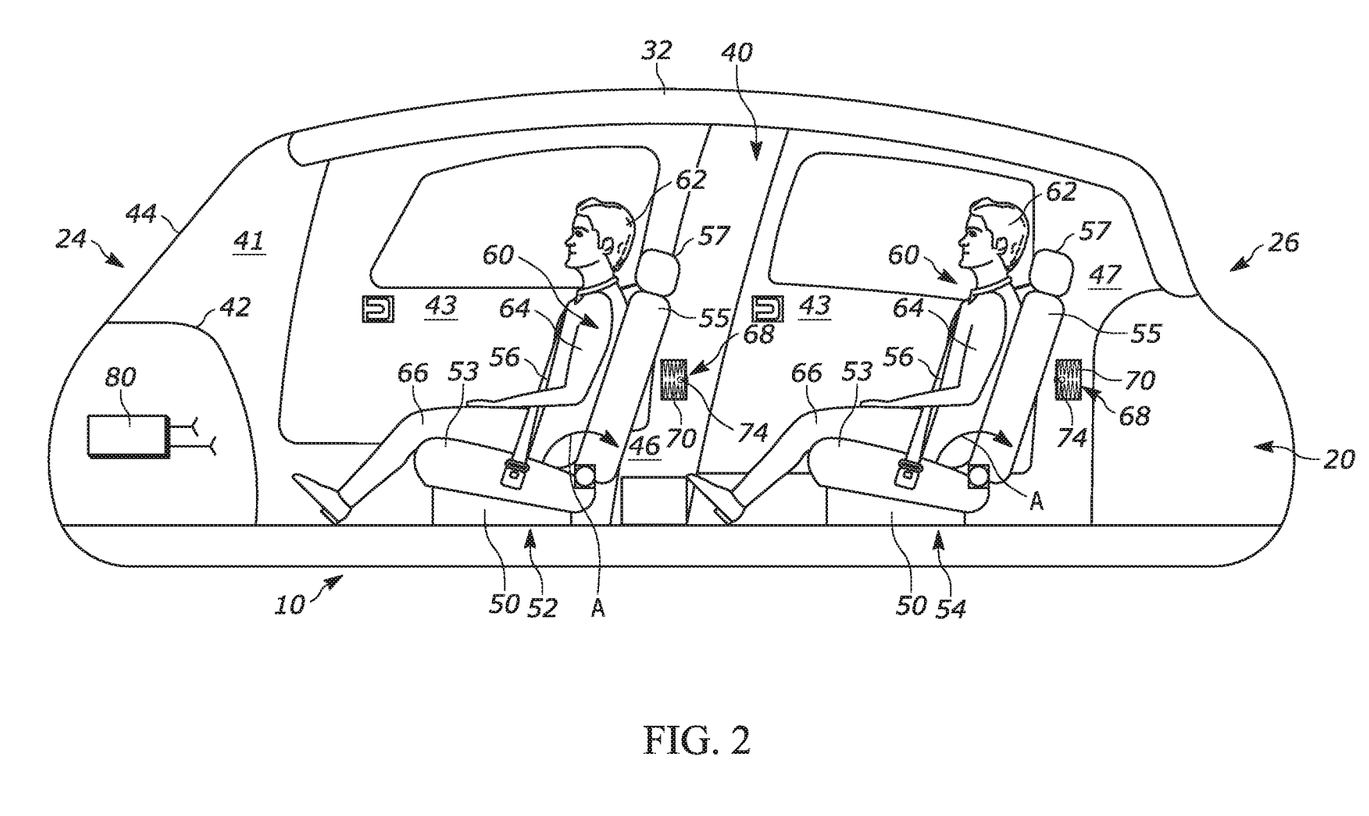
FIG. 2 is a schematic illustration of a cabin of the vehicle with a first seating arrangement and example airbags of the restraint system in a stored condition.

The present invention relates generally to vehicle airbags and, in particular, relates to airbags that use the vehicle side structure as a reaction surface. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. Each side 28, 30 includes side structure, namely, an A-pillar 41, a B-pillar 46, and a C-pillar 47 and doors 43 connected to the pillars.

The first end 24 of the vehicle 20 includes an instrument panel 42 facing a passenger compartment or cabin 40. A windshield or windscreen 44 is located between the instrument panel 42 and the roof 32. The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Figure 3:
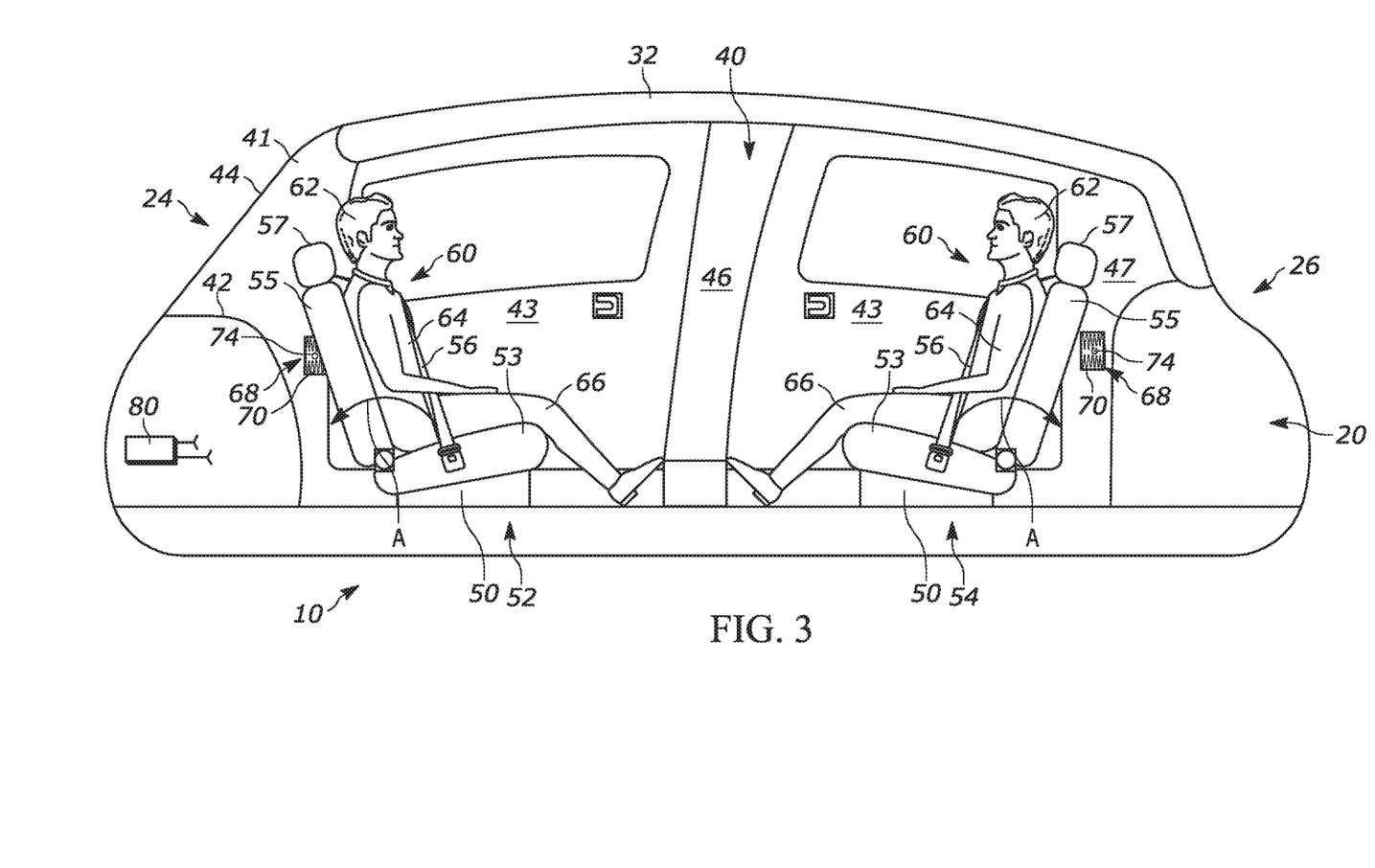
FIG. 3 is a schematic illustration of the cabin of the vehicle with a second seating arrangement and example airbags of the restraint system in a stored condition.

In another seating arrangement shown in FIG. 3, the vehicle 20 includes two rows of seats 50 that face each other, with the front for 52 being rearward-facing and the rear row 54 being forward-facing. For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants, by instrument panel mounted airbags. In the autonomous vehicle 20 of FIG. 3, however, the instrument panel can be reduced in size and/or removed altogether. Control interfaces for climate controls, GPS, navigation, entertainment, etc. can, for example, be provided in a center console area of the vehicle 20 located between the occupants 60 of the front and/or rear rows 52, 54.

That said, for the unconventional, forward-rearward seating arrangement of FIG. 3, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Regardless of the seating arrangement, each seat 50 includes a base or bottom 53 for receiving the legs 66 of the occupant 60. A seatback 55 extends from the base 53 towards the roof 32 and receives the upper torso 64 of the occupant 60. A headrest 57 is connected to the seatback 55 and receives the head 62 of the occupant 60. The position of the seatback 55 relative to the base 53 is adjustable by the user, either manually by a lever or electronically. More specifically, the seatback 55 can pivot or recline relative to the base 53 in the manner indicated by the arrow A. In one example, the seatback 55 can pivot or recline in the range of about 90° relative to the base 53, thereby enabling the occupant 60 to lay down or sleep in the vehicle 20. The seat 50 can also rotate to face forward, rearward, inboard, outboard or in between (not shown).

The occupant restraint system 10 shown in FIGS. 1-4A includes vehicle occupant protection devices in the form of inflatable airbags 70 mounted along the sides 28, 30 of the vehicle 20 and associated with each row 52, 54. Mounting the airbags 70 along the sides 28, 30 is convenient because the airbags can be positioned in locations with a desired proximity to the occupants 60 they are intended to help protect. This can help reduce the necessary inflatable volume of the airbags 70 and can also help provide a desired airbag deployment time without requiring an excessively high-volume inflator.

The airbags 70 are rolled and/or folded before being placed behind the side structure. The rolled airbags 70 can each be provided in a cover or housing/module 68 that is then placed in the side structure. The occupant restraint system 10 also includes an inflator 74 positioned in each module 68 for providing inflation fluid to the respective airbag 70. The inflators 74 are operatively connected (e.g., by wires) to an airbag controller 76 (see FIG. 2) that includes or communicates with one or more crash sensors (not shown). The airbag controller 76 is operative to determine the occurrence of a crash event and to actuate the inflators 74 in a known manner to inflate the airbags 70 associated therewith. The inflators 74 can be of any known type, such as stored gas, solid propellant, augmented or hybrid.

The airbags 70 can be constructed of any suitable material, such as nylon (e.g., woven nylon 6-6 yarns), and may be constructed in any suitable manner. For example, the airbags 70 may include one or more pieces or panels of material. If more than one piece or panel is used, the pieces or panels can be interconnected by known means, such as stitching, ultrasonic welding, heat bonding, or adhesives, to form the airbags 70. The airbags 70 can be uncoated, coated with a material, such as a gas impermeable urethane, or laminated with a material, such as a gas impermeable film. The airbags 70 can therefore have a gas-tight or substantially gas-tight construction. Those skilled in the art will appreciate that alternative materials, such as polyester yarn, and alternatives coatings, such as silicone, may also be used to construct the airbags 70.

The occupant restraint system 10 can include multiple airbags 70 provided along the sides 28, 30 at locations associated and aligned with the seats 50 each row 52, 54. More specifically, for the forward-facing seating arrangement, the airbags 70 associated with the front row 52 are mounted in the B-pillar 46 or front doors 43. The airbags 70 associated with the rear row 54 are mounted in the C-pillar 47 or rear doors 43 (see FIGS. 2 and 4A).

In the rearward-facing seating arrangement, the airbags 70 associated with the front row 52 are mounted in the A-pillar 46. The airbags 70 associated with the rear row 54 are mounted in the C-pillar 47 or rear doors 43 (see FIG. 3). In each case, each row 52, 54 in the vehicle 20 can have a separate pair of modules 68 (with corresponding airbag 70 and inflator 74) associated and aligned therewith on opposite sides 28, 30 of the vehicle 20.

The modules 68 are connected to the side structure adjacent to the associated seats 50 and are generally laterally aligned with the seat. In other words, the modules 68 can be located generally along the height of the seat 50, which is in contrast to side curtain airbags that deploy downwards from the roof or trim adjacent thereto. That said, although the airbags 70 are identical for each row 52, 54 and each side 28, 30 of the vehicle 20, the construction and operation of only the airbag associated with the seat 50 in the front row 52 on the right side 30 is discussed for brevity.

Figure 4A:
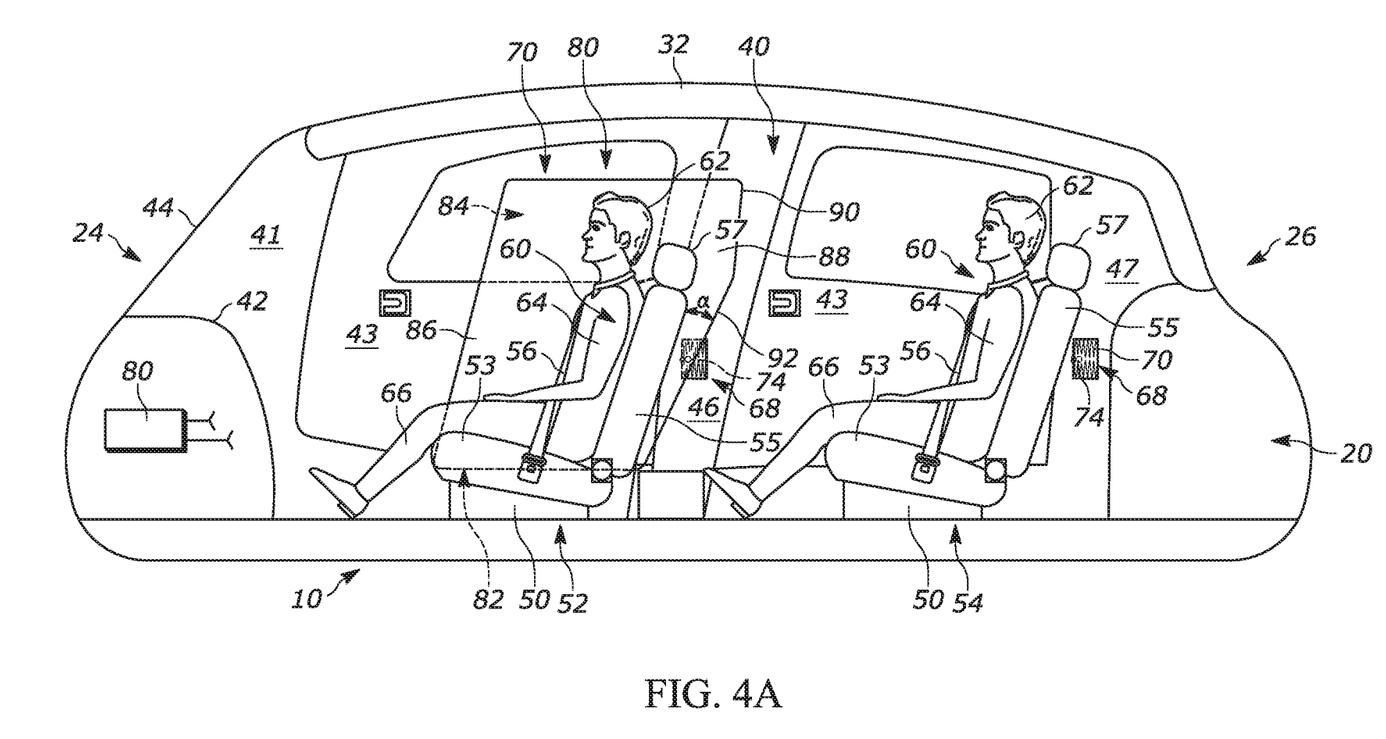
FIG. 4A is a side view of the cabin with an airbag in a deployed condition.
Figure 4B:
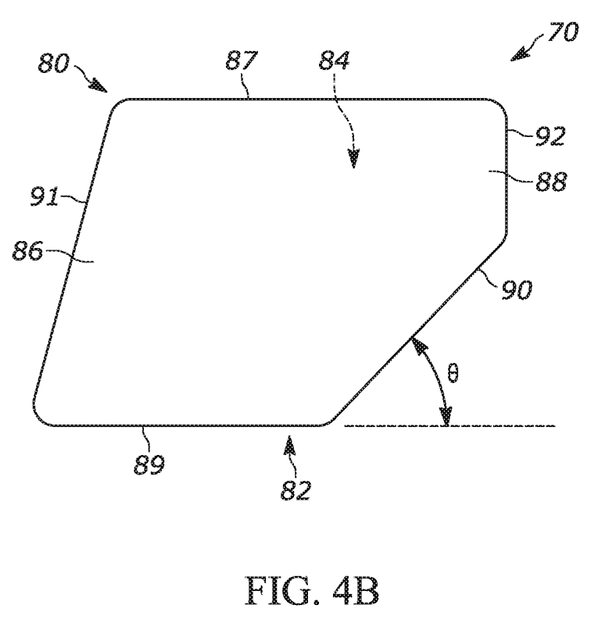
FIG. 4B is a schematic illustration of the airbag.
Figure 4C:
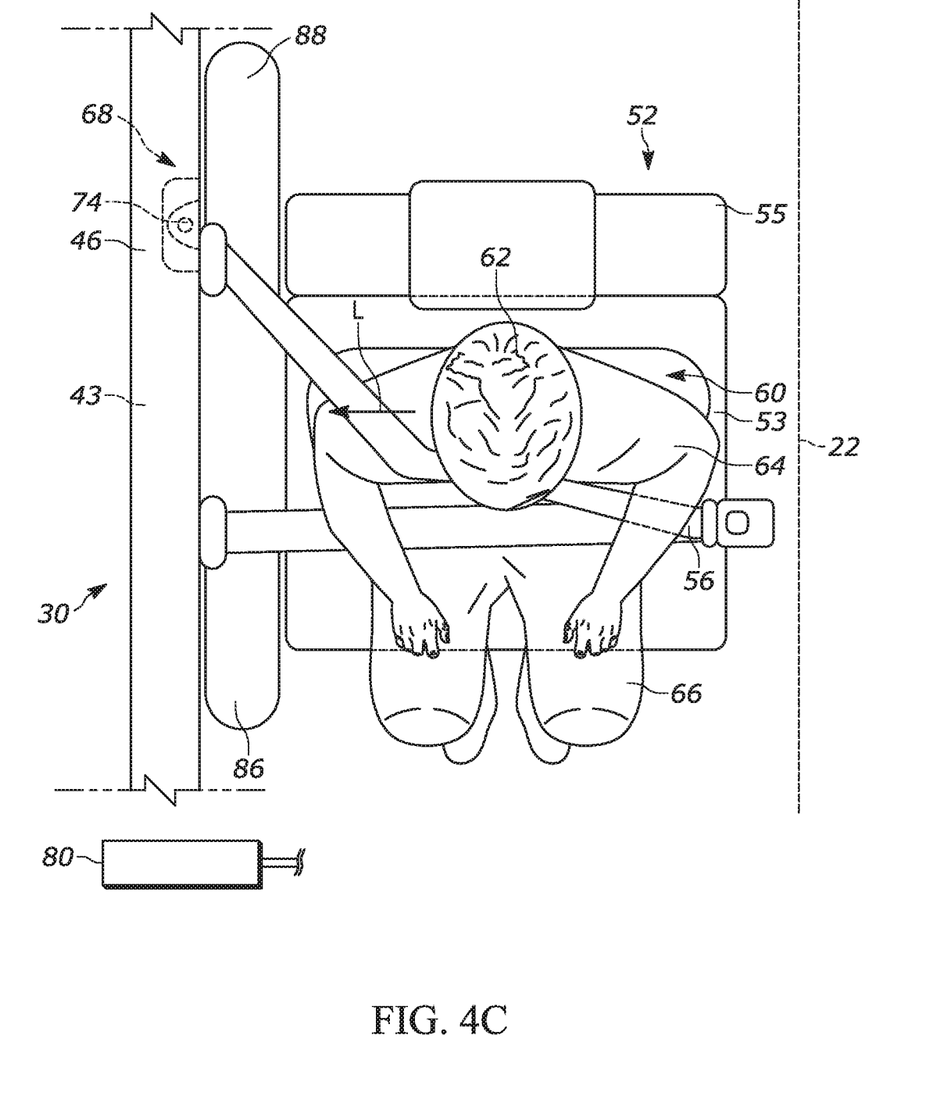
FIG. 4C is a top view of the cabin of FIG. 4B.

Referring to FIGS. 4A-4C, upon sensing the occurrence of an event for which inflation of the airbag 70 is desired, such as a side vehicle collision, the controller 76 provides signals to the inflator 74. Upon receiving the signals from the controller 76, the inflator 74 is actuated and provides inflation fluid to the inflatable volume of the airbag 70 in a known manner. The inflating airbag 70 exerts a force on the B-pillar 46, which causes the B-pillar to open (e.g., via tear seam or door). This releases the airbag 70 to inflate and deploy from a stored condition behind the B-pillar 46 to a deployed condition extending into the cabin 40 between the seat 50 in the front row 52 and the side structure (e.g., the B-pillar 46 and doors 43 connected thereto). The airbag 70 while inflated, helps protect the vehicle occupant 60 in the front row 52 by absorbing the impact of the occupant.

Referring to FIGS. 4A-4B, the airbag 70, when deployed, extends from an upper end 80 to a lower end 82 and defines an inflatable volume 84. The upper end 80 can extend above the seat 50 and includes an edge portion 87. Alternatively, the upper end 80 can extend to a position aligned with or below the headrest 57 (not shown). In either case, the upper end 80 can be spaced from the roof 32.

The lower end 82 is positioned adjacent the base 53 of the seat 50 and includes an edge portion 89 extending substantially parallel to the edge portion 87 and the vehicle floor. In one example, the edge portions 87, 89 are spaced further apart than the height of the seatback 55 such that the airbag 70 is laterally aligned with and extends along the entire height of the seatback.

The airbag 70 extends in a forward-rearward direction between first and second ends 86, 88. The first end 86 is positioned adjacent to or in front of the leading end of the seat base 53. Consequently, the first end 86 is positioned ahead or forward of the occupant's upper torso 64. The first end 86 extends along an edge portion 91 connecting the edges portions 87, 89. The edge portion 91 can extend substantially parallel to the B-pillar 46 and/or seatback 55.

The second end 88 is connected to the B-pillar 46 and fluidly connected to the inflator 74. The second end 88 includes a pair of edge portions 90, 92 connected end-to-end with one another. The edge portions 90, 92 interconnect the edge portions 87, 89 at the second end 88. The edges portions 90, 92 can extend at an angle relative to one another.

In one example, the edge portion 90 extends substantially vertically along or parallel to the B-pillar 46 and parallel to the edge portion 91. The edge portion 92 extends from the edge portion 90 and is angled towards the edge portion 91 at the first end 86. The edge portion 92 extends at an angle θ relative to the forward-rearward direction of the vehicle 20. The angle θ can be between about 30° and about 60°. The upright positon of the seatback 55 is positioned at an angle α in front of the edge portion 92.

The second end 88 extends to a position behind the occupant 60. In the example shown, the second end 88 extends to a position rearward of the B-pillar 46 and rearward of the seat 50 in the front row 52. It will be appreciated, however, that "behind" the occupant 60 refers generally to the opposite direction the occupant is facing in the seat (i.e., towards the rear end 26 for the forward-facing occupant and towards the front end 24 for the rearward-facing occupant). Regardless, the airbag 70 extends beyond the entire depth of the seat 50 in the forward-rearward direction.

When a side vehicle crash occurs (see FIG. 4C), the occupant 60 can be urged to move generally in the inboard-outboard direction of the vehicle (i.e., perpendicular to the vehicle centerline 22). This occurs when the impact is at the left side 28 or right side 30 of the vehicle 20 perpendicular or transverse to the centerline 22. This can also occur in response to an oblique vehicle crash at the front end 24 or rear end 26 of the vehicle 20. Because the occupants 60 are belted, a side or oblique crash resulting in outboard occupant movement causes the occupant to move laterally towards the airbag 70, as indicated generally by the arrow L in FIG. 4C.

Once the moving occupant 60 engages the airbag 70, the airbag is urged to move in the direction L.

The airbag 70, being held in place by its connection to the B-pillar 46 and prevented from moving outboard by the B-pillar and door 43, provides reaction forces that are opposite the impact forces applied to the airbag by the penetrating occupant 60. In other words, the deployed airbag 70 is pinned between the vehicle 20 side structure and the moving/penetrating occupant 60, thereby helping to constrain outboard movement of the occupant. Since the airbag 70 extends the entire height and depth of the seat 50 the airbag is laterally aligned with the occupant's head 62, upper torso 64 and lap 66 when the seatback 55 is in the upright or un-reclined position shown FIGS. 4A and 4C. As a result, the airbag 70 is capable of providing reaction forces to the occupant's head 62, upper torso 64, and lap 66 in response to outboard movement in the manner L when the seatback 55 is in the upright position.

Figure 5A:
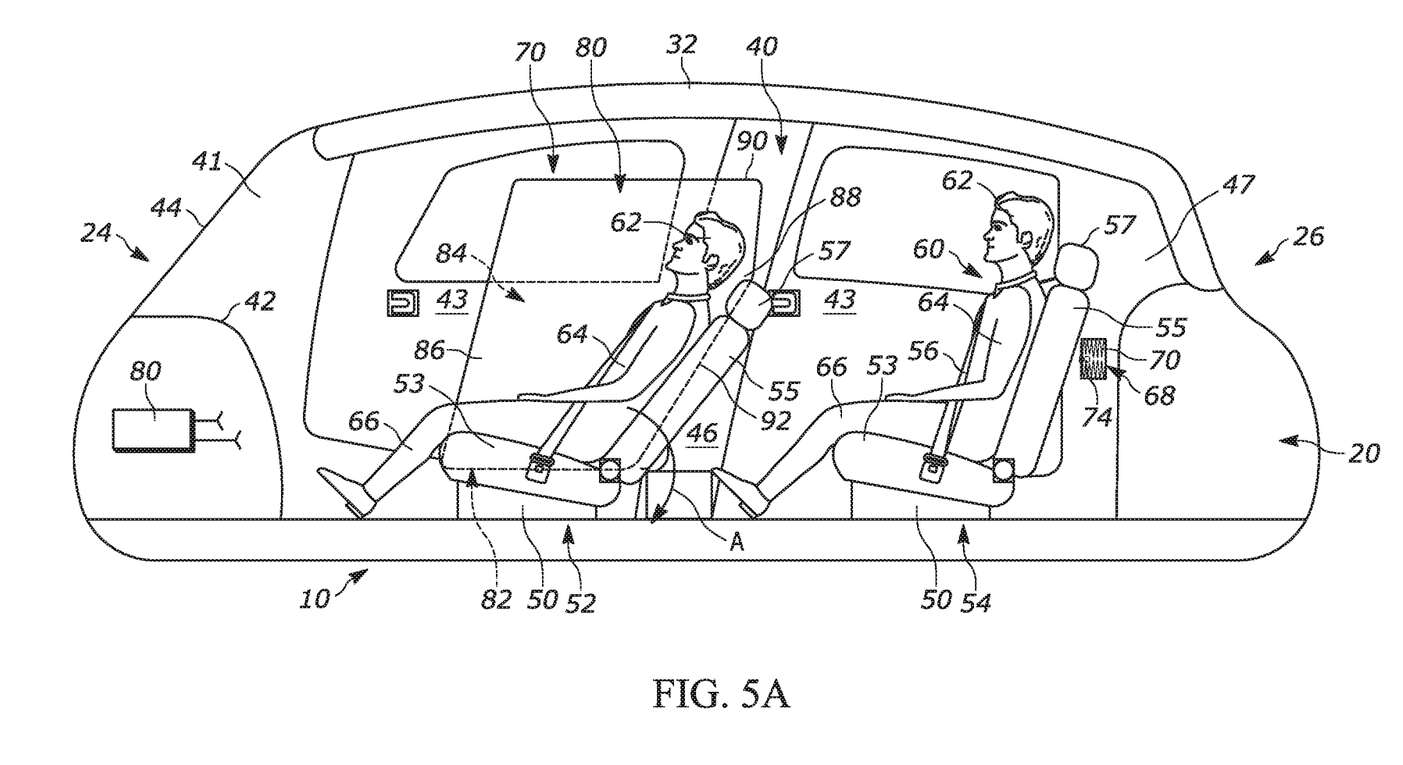
FIG. 5A is a side view of the cabin with a seat in a reclined position.
Figure 5B:
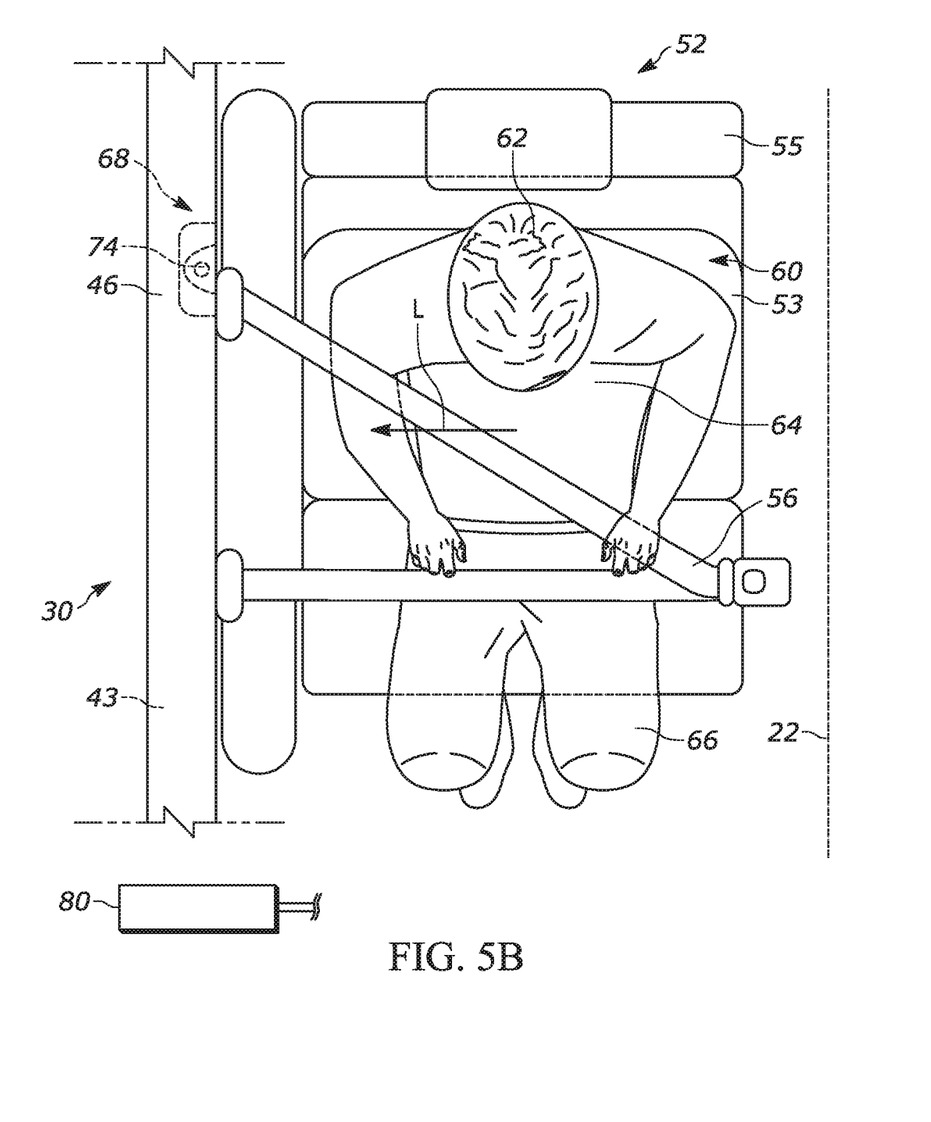
FIG. 5B is a top view of the cabin of FIG. 5A.

With this in mind, the airbag 70 is also specifically configured to help constrain movement of the occupant 60 when the seatback 55 is in a reclined position (see FIGS. 5A-5B). When the seatback 55 is pivoted in the manner A to a reclined position, the seatback extends generally parallel to the edge portion 92 of the second end 88. Consequently, the angle α between the reclined position of the seatback 55 is either nonexistent or negligible and therefore not shown in FIG. 5. The airbag 70 is laterally aligned with the occupant's head 62, upper torso 64 and lap 66 when the seatback 55 is in the reclined position. Accordingly, the airbag 70 is laterally aligned with the occupant's head 62, upper torso 64, and lap 66 regardless of the position of the seatback 55.

It will be appreciated that when the seatback 55 is capable of fully reclining to a position extending generally along/parallel to the floor (not shown), the second end 88 can extend rearward or behind the seat 50 and occupant 60 such that the airbag 70 maintains lateral alignment with the occupant's head 62, upper torso 64, and lap 66.

Due to this construction, when the reclined occupant 60 moves in the outboard direction L in response to a side or oblique vehicle impact (FIG. 5B), the occupant engages the second end 88 of the airbag 70 rather than the side structure. The airbag 70 therefore advantageously provides occupant restraint while taking into account and accommodating both the upright and reclined positions of the seatback 55. This would also allow the airbag 70 to provide occupant restraint if/when the occupant 60 is sleeping in a fully reclined seatback 55.

It will be also appreciated that the vehicle geometry can impact the size, shape, and position of the second end 88 of the airbag 70. To this end, the second end 88 can be configured to accommodate the instrument panel 42 when positioned next to a rearward-facing seat 50 in the front row 52. Similarly, the second end 88 of the airbag 70 can be configured to accommodate additional rows of seating behind the row 54 and/or other vehicle structure (e.g., the rear window/windshield) when positioned next to a forward-facing seat 50 in the row 54.

From the above, it will be appreciated that the example configurations of FIGS. 1-5B illustrate that the airbags are configured to utilize the vehicle side structure as a reaction surface in both the conventional and unconventional seating arrangements. By "reaction surface," it is meant that it is the vehicle side structure that supports the airbags against movement in response to impacting occupants. In other words, the airbags attempts to move in a first direction (outboard) in response to an impacting occupant and the side structure applies a reaction force to the airbags in a second, opposite (or substantially opposite) direction to limit/prevent movement of the airbags in the first direction. This allows the airbags to absorb impact forces of the occupants and provide the desired ride-down effect.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A restraint system for helping to protect an occupant of a vehicle having a side structure and a cabin with a seat for the occupant, comprising:
    an airbag having a stored condition within the vehicle side structure and being inflatable to a deployed condition positioned between the occupant and the vehicle side structure, the airbag extending in a forward-rearward direction from a first end positioned in front of the occupant to a second end positioned behind the occupant such that a torso and head of the occupant are laterally aligned with the second end when the seat is placed in a reclined position, wherein the first and second ends form free ends of the airbag that span only the seat in the forward-rearward direction.

2. The restraint system recited in claim 1, wherein the airbag is positioned in a B-pillar of the vehicle.

3. The restraint system recited in claim 1, wherein the airbag is positioned in a door of the vehicle.

4. The restraint system recited in claim 1, wherein the second end includes first and second edge portions extending at an angle relative to one another.

5. The restraint system recited in claim 4, wherein the first edge portion extends at about 45° from the forward-rearward direction.

6. The restraint system recited in claim 4, wherein the first edge portion extends from a lower end of the airbag and the second edge portion extends from the first edge portion to an upper end of the airbag.

7. The restraint system recited in claim 6, wherein the second edge portion extends substantially vertically from the first edge portion.

8. The restraint system recited in claim 1, wherein the airbag extends from an upper end positioned adjacent a headrest of the seat to a lower end positioned adjacent a seat base of the seat.

9. The restraint system recited in claim 1, wherein the second end includes a tapered portion extending substantially parallel to the seat in the reclined position.

10. The restraint system recited in claim 1, wherein the airbag is spaced from a roof of the vehicle when in the deployed condition.

11. The restraint system recited in claim 1, further comprising:
    a sensor for sensing the occurrence of an event for which deployment of the airbag is desired and producing a signal indicative thereof; and
    a controller connected to the sensor and, in response to receiving the signal, actuating an inflator to inflate the airbag to the deployed condition.

12. A restraint system for helping to protect an occupant of a vehicle having a side structure and a cabin with a seat for the occupant, comprising:

an airbag having a stored condition within the vehicle side structure and being inflatable to a deployed condition positioned between the occupant and the vehicle side structure, the airbag including an upper end positioned adjacent a headrest of the seat and a lower end positioned adjacent a seat base of the seat, the airbag extending in a forward-rearward direction from a first end positioned in front of the occupant to a second end positioned behind the occupant, the second end including a tapered portion laterally aligned with a torso and head of the occupant when the seat is placed in a reclined position.

13. The restraint system recited in claim 12, wherein the airbag is positioned in a B-pillar of the vehicle.

14. The restraint system recited in claim 12, wherein the airbag is positioned in a door of the vehicle.

15. The restraint system recited in claim 12, wherein the tapered portion includes first and second edge portions extending at an angle relative to one another.

16. The restraint system recited in claim 15, wherein the first edge portion extends at about 45° from the forward-rearward direction.

17. The restraint system recited in claim 15, wherein the first edge portion extends from a lower end of the airbag and the second edge portion extends from the first edge portion to an upper end of the airbag.

18. The restraint system recited in claim 17, wherein the second edge portion extends substantially vertically from the first edge portion.

19. The restraint system recited in claim 12, wherein the airbag is spaced from a roof of the vehicle when in the deployed condition.

20. The restraint system recited in claim 12, further comprising:
    a sensor for sensing the occurrence of an event for which deployment of the airbag is desired and producing a signal indicative thereof; and
    a controller connected to the sensor and, in response to receiving the signal, actuating an inflator to inflate the airbag to the deployed condition.

21. A restraint system for helping to protect an occupant of a vehicle having a side structure and a cabin with a seat for the occupant, comprising:
    an airbag having a stored condition within the vehicle side structure and being inflatable to a deployed condition positioned between the occupant and the vehicle side structure, the airbag including an upper end positioned above a headrest of the seat and a lower end positioned adjacent a base of the seat, the airbag extending in a forward-rearward direction from a first free end positioned adjacent a leading end of the seat to a second free end positioned behind the seat such that a torso and head of the occupant are laterally aligned with the second end when the seat is placed in a reclined position, the second free end including a tapered portion deployable relative to the seat to a position extending substantially parallel to the seat in the reclined position.

* * * * *